(12) United States Patent
Spahr et al.

(10) Patent No.: US 8,113,529 B2
(45) Date of Patent: Feb. 14, 2012

(54) BICYCLE COMPONENT

(75) Inventors: Stefan Spahr, Lengnau (CH); Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 143 days.

(21) Appl. No.: 12/401,333

(22) Filed: Mar. 10, 2009

(65) Prior Publication Data

US 2009/0230653 A1 Sep. 17, 2009

(30) Foreign Application Priority Data

Mar. 12, 2008 (DE) .......................... 10 2008 013 938

(51) Int. Cl.
*B60B 35/00* (2006.01)

(52) U.S. Cl. ....................................... 280/276; 280/279

(58) Field of Classification Search .................. 280/276, 280/279
See application file for complete search history.

(56) References Cited

U.S. PATENT DOCUMENTS

| | | | | |
|---|---|---|---|---|
| 3,507,516 A | | 4/1970 | Fritz | |
| 3,610,659 A | | 10/1971 | Gerarde | |
| 4,121,850 A | * | 10/1978 | Ross | 280/279 |
| 4,424,981 A | * | 1/1984 | Maxwell, III | 280/288 |
| 4,632,415 A | * | 12/1986 | San Hai | 280/279 |
| 4,765,443 A | * | 8/1988 | Cunningham | 188/24.21 |
| 5,165,762 A | * | 11/1992 | Phillips | 301/110.5 |
| 5,193,832 A | * | 3/1993 | Wilson et al. | 280/276 |
| 5,238,259 A | * | 8/1993 | Wilson et al. | 280/276 |
| 5,326,157 A | * | 7/1994 | Nagano | 301/110.5 |
| 5,494,390 A | * | 2/1996 | Gonzales | 411/368 |
| 5,622,412 A | * | 4/1997 | Yamane | 301/124.2 |
| 5,626,401 A | * | 5/1997 | Terry et al. | 301/59 |
| 5,647,643 A | * | 7/1997 | Noble | 301/110.5 |
| 5,823,555 A | * | 10/1998 | Ashman | 280/279 |
| 6,036,212 A | * | 3/2000 | Baldomero | 280/276 |
| 6,193,323 B1 | * | 2/2001 | Lin | 301/110.5 |
| 6,386,643 B1 | * | 5/2002 | Marzocchi et al. | 301/110.5 |
| 6,412,803 B1 | * | 7/2002 | Lalikyan et al. | 280/276 |
| 6,505,699 B1 | * | 1/2003 | Christini et al. | 180/224 |
| 6,761,417 B2 | * | 7/2004 | Denby | 301/124.2 |
| 7,066,556 B2 | * | 6/2006 | Irie | 301/6.9 |
| 7,076,978 B2 | * | 7/2006 | Denby | 70/233 |
| RE39,528 E | * | 3/2007 | Kanehisa et al. | 301/110.5 |

(Continued)

FOREIGN PATENT DOCUMENTS

CN 2442926 Y 8/2001

(Continued)

OTHER PUBLICATIONS

German Office Action from the German Patent Office in the corresponding priority application 10 2008 013 938.6.

*Primary Examiner* — Anne Marie Boehler
*Assistant Examiner* — Michael Stabley
(74) *Attorney, Agent, or Firm* — Greer, Burns & Crain, Ltd.

(57) ABSTRACT

A bicycle component with a wheel mount at which a wheel with a hub can be received, with the wheel mount including two tube components provided with a mounting device at each of its end portions. At the mounting device of at least one tube component a bushing device is arranged to be exchangeable and to be suitable and intended to receive and support a hub.

22 Claims, 4 Drawing Sheets

U.S. PATENT DOCUMENTS

| | | | |
|---|---|---|---|
| 7,556,321 B2 * | 7/2009 | Hara et al. | 301/124.2 |
| 7,648,211 B2 * | 1/2010 | Watarai | 301/110.5 |
| 7,665,928 B2 * | 2/2010 | Winefordner et al. | 403/322.4 |
| 7,722,129 B2 * | 5/2010 | Cusack | 301/124.2 |
| 7,753,454 B2 * | 7/2010 | Hara et al. | 301/124.2 |
| 2004/0084955 A1 * | 5/2004 | Denby | 301/124.2 |
| 2004/0135425 A1 * | 7/2004 | Irie | 301/105.1 |
| 2004/0165805 A1 * | 8/2004 | Kanehisa et al. | 384/545 |
| 2005/0051993 A1 * | 3/2005 | Ito et al. | 280/276 |
| 2005/0120762 A1 * | 6/2005 | Denby | 70/233 |
| 2007/0052285 A1 * | 3/2007 | Montague et al. | 301/124.1 |
| 2008/0191545 A1 * | 8/2008 | Laird | 301/124.1 |
| 2008/0238027 A1 * | 10/2008 | Talavasek | 280/281.1 |

FOREIGN PATENT DOCUMENTS

| | | |
|---|---|---|
| DE | 76 10 061 | 5/1976 |
| DE | 91 04 109 | 4/1991 |
| EP | 1 953 008 A1 | 8/2008 |
| FR | 13 47 057 | 10/1962 |

* cited by examiner

BICYCLE COMPONENT

BACKGROUND

The present invention relates to a system for mounting a wheel and in particular a bicycle component with a wheel mount where a wheel having a hub can be received, and a bicycle component with a wheel received in a wheel mount. The bicycle component according to the invention can be configured for example as a front wheel fork or as a bicycle frame at which a wheel can be received.

Bicycle components which can receive a wheel have become known in the prior art. For example, front wheel forks have become known where the dropouts provided at the lower ends of the stationary tubes are provided with a mounting slot into which a fixed axle of a wheel hub can be inserted to thus affix the wheel to the fork.

If a knock-out spindle is used, said knock-out spindle is inserted through the hub and the fork dropouts and screwed to a front fork dropout. As an alternative a quick release may be employed which is inserted through the hollow hub axle, urging the dropouts against the fixed axle on the outsides of the dropouts, thus clamping the wheel to the front fork.

Demands on the stressability of bicycles keep increasing. In particular in riding a mountain bike on rough ground or on the road the user sets store by a firm, rigid connection between the handlebar and the front wheel in the case of obstacles in the way, such that, rocks or other obstacles notwithstanding, the handlebar precisely follows the steering movements of the user and is not distorted due to insufficient rigidity.

To enhance the clamping effect, knurled disks tend to be employed at the contact surface between the dropout and the fixed axle, cutting into the dropout surface due to their knurled surface, thus achieving a firm contact.

Using knurled disks, however, involves the drawback that after repeatedly mounting and demounting the wheel the dropout surfaces are adversely affected by the loads occurring such that the front wheel fork or the bicycle frame may become useless although the components have not reached their load limits by far.

If no knurled disks are used, repeatedly mounting and demounting the wheel will still lead to wear of the contact and supporting surfaces.

One may try to reduce wear by hardening the loaded surfaces or manufacturing them from more stable and durable materials.

These solutions are, however, unsatisfactory since they may adversely affect the strength of the connection or increase the weight. Moreover, wear will still occur.

It is therefore the object of the present invention to provide a bicycle component which allows a secure connection with a wheel and has a long service life.

SUMMARY

The bicycle component according to the invention comprises a wheel mount intended to receive a wheel by the wheel hub. The wheel mount comprises at least two tube components with a mounting device provided at each end portion. The mounting device of at least one tube component has at least one exchangeable bushing device arranged on it, said bushing device being suitable and intended to receive and support a hub. For example each end of the corresponding tube component is provided with one mounting device each in which the bushing device is arranged to be exchangeable.

The bicycle component according to the invention has many advantages. One considerable advantage of the bicycle component according to the invention is that the wheel is received and supported at the bushing device through the hub of the wheel.

The hub is in particular only received and supported at the bushing device such that the hub and the wheel as a whole, when inserted in the wheel mount, only make contact with the bushing but not with other parts of the bicycle component. This provides for considerably reduced wear due to mounting and demounting the wheel so as to extend the life of the bicycle component. When the bushing device or its contact surface is eventually worn out, the bushing device can be replaced so as to provide a virtually new bicycle component. Replacing the entire bicycle component is not required, however, when only the contact surfaces to the knurled disks of the hub are worn out.

Furthermore, in the prior art frequent changes of the wheel causes the radial contact surfaces between a knock-out spindle and the fork to be stressed also and wearing out, such that after a plurality of changes, larger play results which in turn leads to reduced rigidity of the known bicycle components.

By way of a simple replacement of the bushing device the present invention allows a considerably extended life and an improved seat of the wheel on the bicycle component since the bushing device may be replaced after little wear. The effort required is considerably less than for replacing the entire component.

Furthermore the bushing device can be manufactured from better materials since only a small amount of mass is required on the whole. The surface quality can likewise be improved and considerable efforts can be made for the surface finishing of the bushing device to thus provide on the whole a bushing device and thus bicycle component of high quality.

In preferred embodiments at least one bushing device is arranged both on the one mounting device on the one side and on the other mounting device on the other side of the wheel.

Advantageously at least one bushing device comprises a male thread extending in particular only over part of the axial length of the bushing device. A male thread which in particular matches a corresponding female thread of the mounting device allows to provide a simple, reliable connection of the bushing device with the mounting device.

Preferably at least one bushing device comprises a snug fit on its external surface. It is possible for the snug fit to extend only over part of the axial length of the bushing device. Or else it is possible and preferred for the snug fit to extend over the entire length of the bushing device. It is as well conceivable that the bushing device comprises on one side a snug fit over its entire length while the bushing device comprises on the other side a snug fit extending only over a part, for example over about half the length of the bushing device.

In other configurations or additionally the bushing device may be glued into the mounting device. It is also possible for the bushing device to be form-fittingly received in the mounting device and optionally glued in additionally. In addition the bushing device may be clamped by suitable means. Also, a form-fitting mount for example via a hexagonal configuration or a squared configuration may be chosen to secure the bushing device in the mounting device.

What is particularly preferred is a bushing device in which a snug fit extends over a longitudinal region followed by a male thread over another longitudinal region. Therein an outer diameter of the male thread is in particular smaller than an outer diameter of the bushing device in the region of the snug fit on the outer surface. Preferably the region of the male thread of the bushing device is provided on an axially outer surface such that the region of the snug fit is arranged to be closer to a mounted wheel than is the region of the male thread.

In all of the configurations it is preferred for at least one bushing device to comprise at least one axial mating surface wherein the hub is supported and retained on an axial mating surface.

In advantageous configurations the bushing device of the one mounting device comprises on its inner periphery a snug fit extending over the entire length of the bushing device.

The bushing device of the other mounting device comprises in particular a snug fit on its inner periphery and axially adjacent thereto a female thread with both the snug fit and the female thread extending over part of the axial length of the bushing device.

For example when a knock-out spindle is inserted, the male-thread front end of the knock-out spindle can be passed through one of the bushing devices and inserted into the other bushing device until the male thread region of the knock-out spindle reaches the female thread of the other bushing device. Then the knock-out spindle can be screwed to the bushing device of the other mounting device such that the knock-out spindle is securely received on the bicycle component.

Preferably the bushing device at least of the other mounting device comprises an inner peripheral groove in which an O-ring or the like is inserted. This is how an additional anti-loss protection is achieved since the O-ring inhibits a rotation of the inserted axle.

In all of the configurations it is preferred that each of the two mounting devices comprises a cylindrical mounting opening for receiving the bushing device.

Preferably at least one mounting device and in particular both of the mounting devices comprise axially inwardly an axially projecting edge or a projection as an end bearing for the hub in a non-tightened state to facilitate insertion of an axle.

The end bearing may be configured in particular sickle-shaped and it may substantially be provided on the top surface of the mounting device. The advantage of this is that a wheel can be inserted with its hub in the end bearings of a bicycle positioned upside down, which considerably facilitates the passing of a knock-out spindle or a quick release through the hub.

It is conceivable as well for the end bearings to be propped on the hub of the wheel which is stood upright on the ground when mounting a wheel such that the user only needs to lightly hold the wheel and the bicycle with his hand for inserting the knock-out spindle or a quick release through the bushing device. Threading is considerably facilitated.

Preferably a radius of the cylindrical mounting opening equals a radius of the axially projecting edge of the end bearing. This offers the advantage that the cylindrical mounting opening and the axially projecting edge can be manufactured or re-machined in one machining step so as to reduce the manufacturing steps.

Preferably one axle device is provided on the bicycle component comprising an elongated, cylindrical axle. Preferably it comprises an operating member which in particular protrudes outwardly. What is also possible is an axle device in which an external hexagon or the like is provided at or can be screwed onto the end to secure a wheel to the bicycle component.

Preferably at least one external diameter of the axle is matched to the internal diameter of the bushing device at least over portions in the region of the bushing device so as to provide a snug fit allowing a connection that is in particular firm and free of play.

In particularly preferred embodiments the axle is configured as a knock-out spindle device. In this way, high stability and high rigidity are achieved so as to reduce possible torsion.

Preferably the operating member interacts with a thread so as to tighten the axle device by way of rotating the operating member. To this end the axle is e.g. screwed into a bushing device until an axial mating surface of the axle device firmly clamps the hub.

The operating member is advantageously arranged close enough to a tube component of the bicycle component to allow the operating member to rotate only about an angle smaller than 360 degrees, in particular when the hub or the wheel is almost firmly tightened.

Preferably the operating member can first rotate entirely freely when tightening, approaching the tube component in tightening until ultimately the operating member is positioned close enough to the tube component for the tube component to project into the pivot range of the operating member and a complete rotation of the operating member is now prohibited.

Preferably at least then the operating member is positioned close enough to the tube component for the tube component to project into the pivot range of the operating member.

Advantageously the axle device is provided with a ratchet mechanism which in particular permits to enable the operating member to pivot so as to not affect a rotation of the axle.

The operating member in particular interacts with a thread so as to tighten the axle device by way of rotating the operating member. To this end the operating member and the axle may be coupled via a longitudinal toothing.

Preferably the operating member is axially movable outwardly against the biasing force of a biasing device to bring the longitudinal toothings or the operating member out of engagement with the axle. In this way the operating member is now rotatable without transmitting the rotational movement to the axle and thus the thread.

Another bicycle component according to the invention comprises a wheel mount and a wheel received thereat or at least a hub received thereat. The hub comprises a fixed axle and the wheel mount comprises at least two tube components with a mounting device provided at each of their end portions between which the hub is received and supported. In the end portion of at least one tube component of the wheel mount at least one bushing device is arranged to be exchangeable and to receive the fixed axle of the hub.

This bicycle component according to the invention also has considerable advantages since the life of the bicycle component is extended according to the invention while concurrently allowing an enhanced quality of the connection of the bicycle component with the wheel.

Preferably the hub bears against the bushing devices with front end faces only. This means that only the front end faces of the hub come into contact with the bushing devices. Since the bushing devices are exchangeable, the bushing devices can be replaced when the contact surfaces are worn to bring the bicycle component back into a better quality condition. Preferably the front faces of the end faces of the hub are formed by knurled disks which are preferably hardened.

The front face of the hub may be provided with adapting pieces which may comprise the front end faces. The adapting pieces can preferably be axially fastened to the hub. It may be provided for the adapting pieces to be screwed onto the axial hub ends, or pushed into a hollow axle, or pushed onto a hub axle.

All of the embodiments preferably provide for the mounting device to surround the hub at least substantially contactless.

It is preferred that more specific embodiments of this bicycle component comprise features of the bicycle component as described above.

The front wheel fork according to the invention comprises two stationary tubes each provided with a dropout, wherein a wheel can be mounted by its hub between the dropouts of the two stationary tubes. At the dropout of at least one stationary tube at least one bushing device is arranged to be exchangeable and to be suitable and intended to receive and support a hub of a wheel.

BRIEF DESCRIPTION OF THE DRAWINGS

Other advantages and possibilities of application of the present invention can be taken from the exemplary embodiment which will now be described with reference to the accompanying figures.

The figures show in.

DETAILED DESCRIPTION

Figure 1:
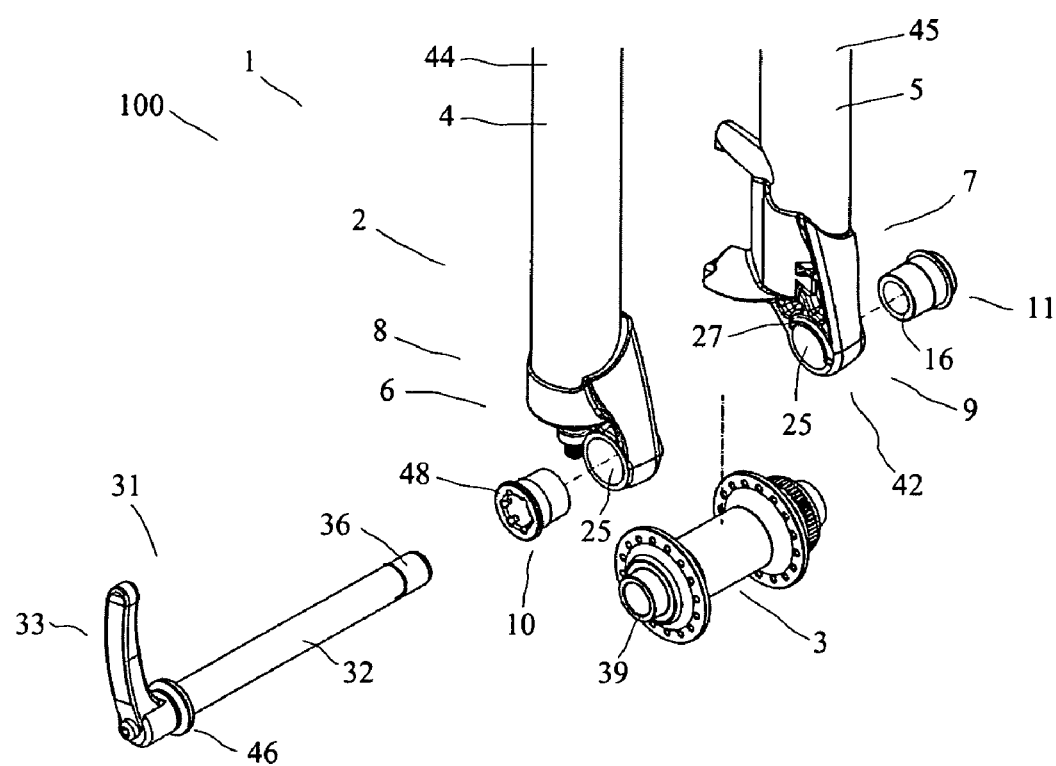
FIG. 1 a perspective, exploded view of a bicycle component according to the invention.

An exemplary embodiment of the present invention will now be described with reference to the accompanying figures.

The bicycle component 1 according to the invention is in particular configured as a front wheel fork 100 and comprises two tube components 4, 5 or stationary tubes 44, 45 whose end portions 6, 7 are provided with a wheel mount 2 with mounting devices 8, 9 with the mounting devices 8, 9 serving as dropouts 42.

A wheel can be received between the two tube components 4, 5 wherein only the wheel hub 3 is illustrated.

The mounting devices 8, 9 or dropouts 42 have bushing devices 10, 11 inserted therein which in the case that the contact surfaces are worn out are easily replaceable to achieve a longer service life of the entire bicycle component 1. Wear can in particular occur at the contact surfaces with the hub 3 or with the axle device 31 or the knurled disk 46 of the axle device 31.

The bushing devices 10, 11 comprise axial mating surfaces 16 and 48 against which the hub 3 or the knurled disk 46 of the axle device 31 bear when installed. The dimensions are configured such that the hub 3 when installed only comes into contact with contact surfaces of the bushing devices 10 and 11 but not with other parts of the stationary tubes 44, 45. In this way it is ensured that only the exchangeable bushing devices 10, 11 are subjected to any wear. The bushing devices can be released and replaced with a suitable tool as required.

The axle 32 of the axle device 31 comprises a male thread 36 at the end opposite the operating member to engage with a female thread 20 of the bushing device 11 to thus tighten the axle 32.

In the suspension fork 100 or the bicycle component 1 only the outer surface of the axle 32 and the axial end faces 16 and 48 of the bushing devices 10, 11 and the axial end face 46 of the axle device 31 contact one another such that wear can only occur at replaceable components.

Figure 2:
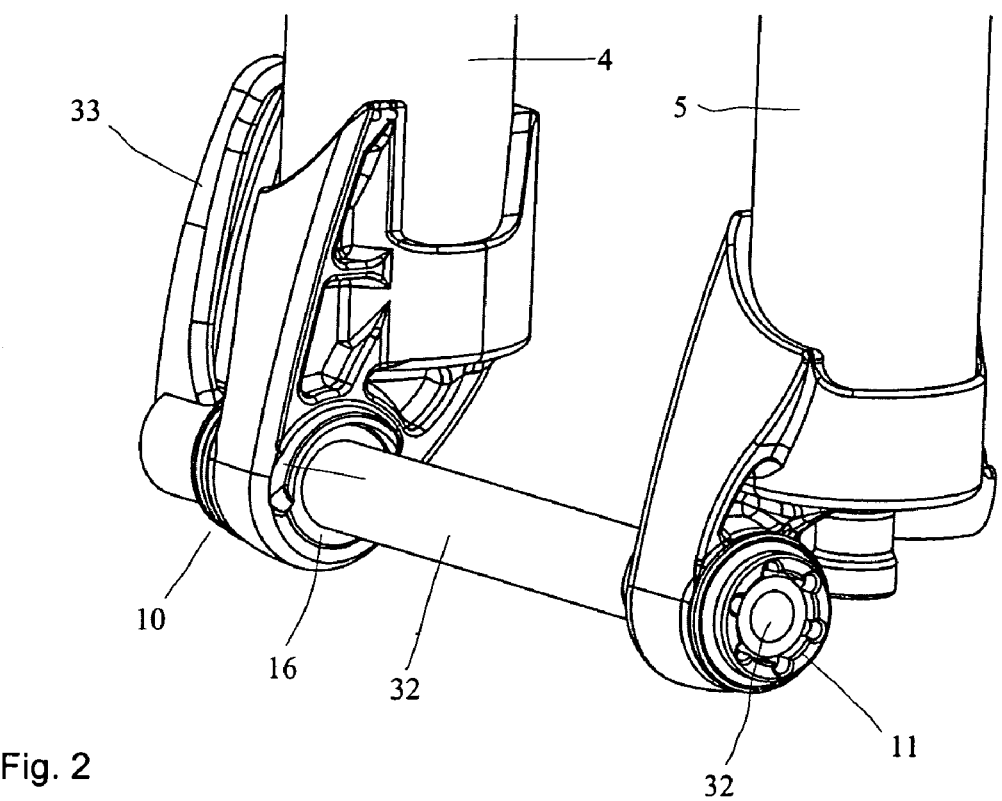
FIG. 2 a perspective view of the bicycle component in FIG. 1 without the hub.

FIG. 2 illustrates the bicycle component 1 in a perspective illustration wherein the hub 3 was omitted for reasons of clarity. The axle 32 extends through the cylindrical mounting holes 25 in the mounting devices 8 and 9 in which the bushing devices 10 and 11 are arranged.

The upper side of the axle 32 is provided with axial appendages or projecting edges 26 (FIG. 5) on the two tube components 4 and 5 projecting axially inwardly by a width 59 (FIG. 5), forming end bearings 27 on which a wheel or a hub 3 may be placed for example with the bicycle positioned upside down.

This facilitates inserting and threading of the axle 32 which is in particular configured as a knock-out spindle, into the opening in the bushing devices since the hub is basically already held in the intended position. Although there is a small radial distance which may presently be for example 0.5 or 1 mm so as to prevent contact of the outer surface of the hub and of the tube component 4 or 5, the hub 3 is already approximately in the intended place in this position which facilitates insertion considerably.

Threading in is likewise facilitated when the fork is placed on the wheel which is stood upright on the ground since the end bearings 27 likewise ensure optimum pre-positioning of the suspension fork relative to the hub.

Figure 3:
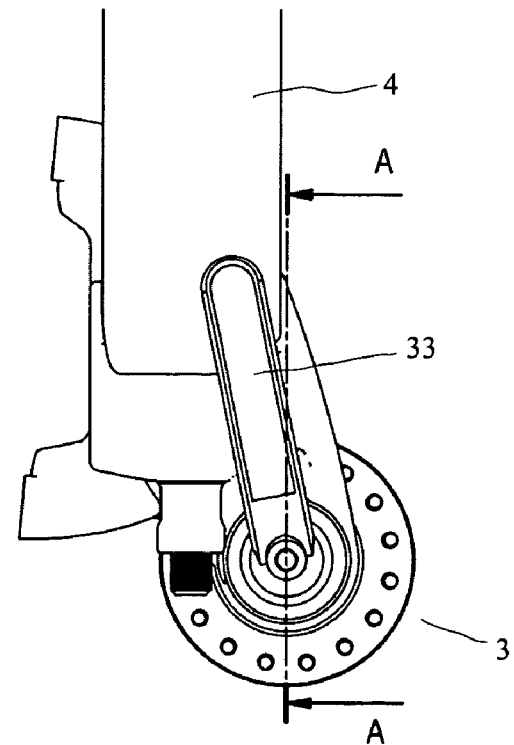
FIG. 3 a side view of the bicycle component in FIG. 1.

FIG. 3 shows a side view in which the operating member 33 is oriented upwardly. When tightened, the operating member cannot make a full rotation so as to provide anti-loss protection and protection against inadvertent release of the knock-out spindle.

The dimensions of the operating member and the distances from the bushing device 10 are in particular such that the operating member can firstly be screwed in several revolutions until the axle 32 is nearly tightened. Then the operating member 33 will have approached the tube component 4 far enough for the operating member 33 to hit against the tube component 4 when rotating further. Then, to further tighten the axle device the ratchet mechanism 37 of the axle device 31 must be operated and the operating lever 33 pulled axially outwardly against the force of the biasing spring 38, such that the none rotatable connection of the axle 32 with the operating member 33 is released since the axial toothings 49 are brought out of engagement.

Thereafter the operating member 33 can be pivoted back and again brought into engagement with the axial toothing 49 to thus allow further tightening of the connection.

Figure 4:
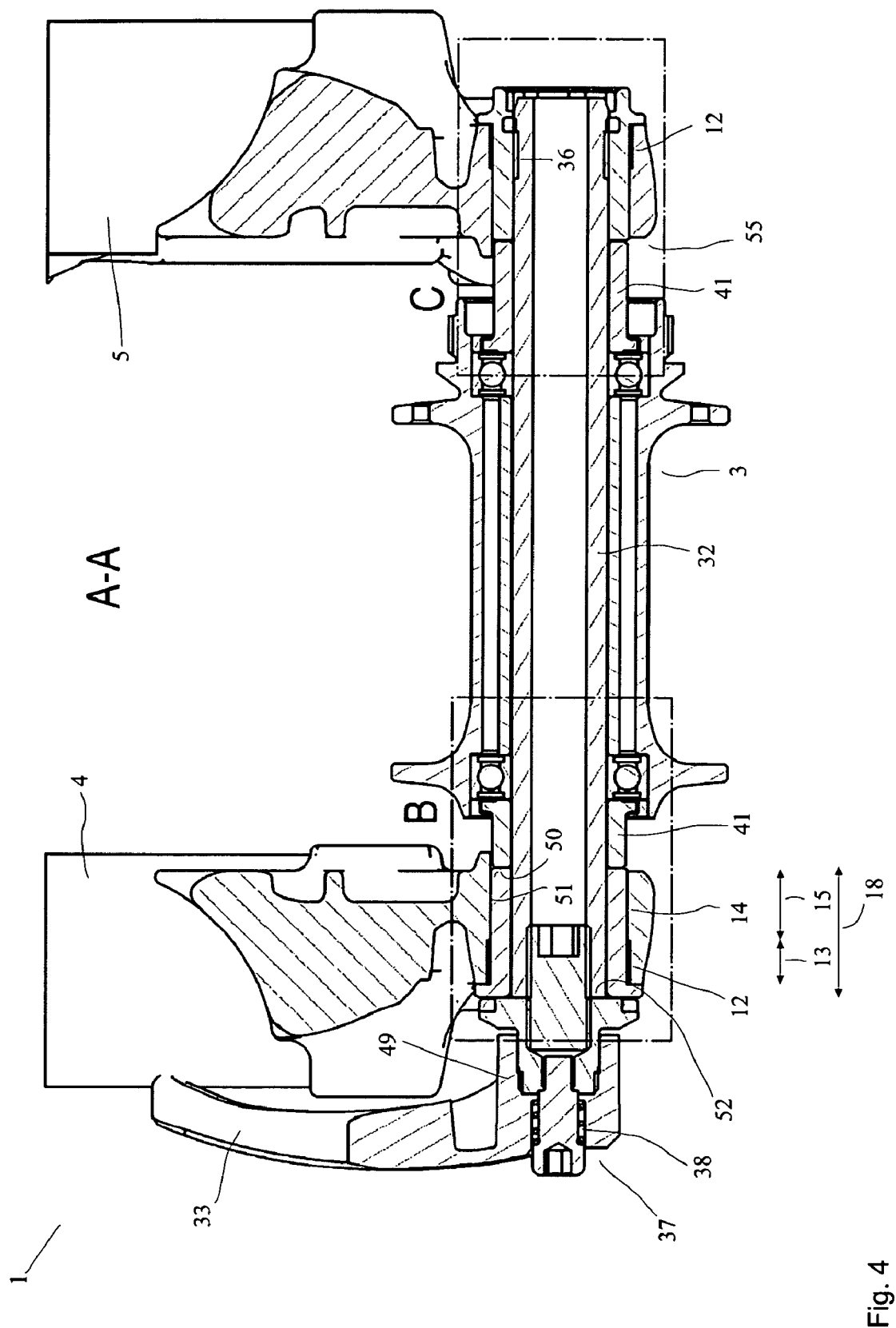
FIG. 4 a cross-section through the bicycle component in FIG. 1.

As illustrated in FIG. 4, the axial outer surfaces of the hub 3 are provided with adapting pieces 41 whose axial contact surfaces may be provided with knurled disks. The adapting pieces 41 axially abut with contact surfaces 39 and 16 of the bushing devices 10 and 11.

The bushing devices 10 and 11 comprise male threads 12 extending over an axial length 13 followed by a snug fit 14 each over an axial width 15. The snug fits 14 are provided axially inwardly while the male threads 12 at the bushing devices 10 and 11 are provided axially outwardly on the tube components 4 and 5. The male threads 12 engage corresponding female threads in the tube components 4 and 5. Or else, gluing or a form-fitting connection is conceivable instead.

On the whole one achieves a firm, torsionally resistant and rigid connection by way of the male threads 12 and the snug fits 14 such that the hub and the wheel are firmly mounted to the bicycle component.

The two axial part lengths 13 of the male threads 12 and 15 of the snug fit 14 complement one another to form the axial length 18 of the bushing devices 10 and 11.

While a projection or a projecting edge 26 projecting axially inwardly is provided on the upper side 28 of the mounting devices 8 and 9, an axial recess 55 is provided on the lower side of the mounting devices 8 and 9 or tube components 4 and 5, such that the axial distance between the tube components is larger at the lowermost ends of the tube components 4 and 5 than in the region of the projecting edges 26 or in the region of the contact surfaces 50.

The advantage of this is that when inserting a hub 3 or a wheel from beneath, the tube components 4 and 5 or the mounting devices 8 and 9 are protected better from contact with the hub 3 since the available width is considerably larger than necessary. In this way, wear and damage to the lower ends of the tube components 4 and 5 occurring in mounting and demounting the wheels is largely avoided such that service life is extended.

On the whole, only the axial contact surfaces 50 and 52 and the radial contact surface 51 are in contact with the hub 3 or the tightening device of the axle device. All of the contact surfaces are exclusively provided on the bushing devices 10 and 11 such that if any wear becomes apparent the bushings can be replaced.

Figure 5:
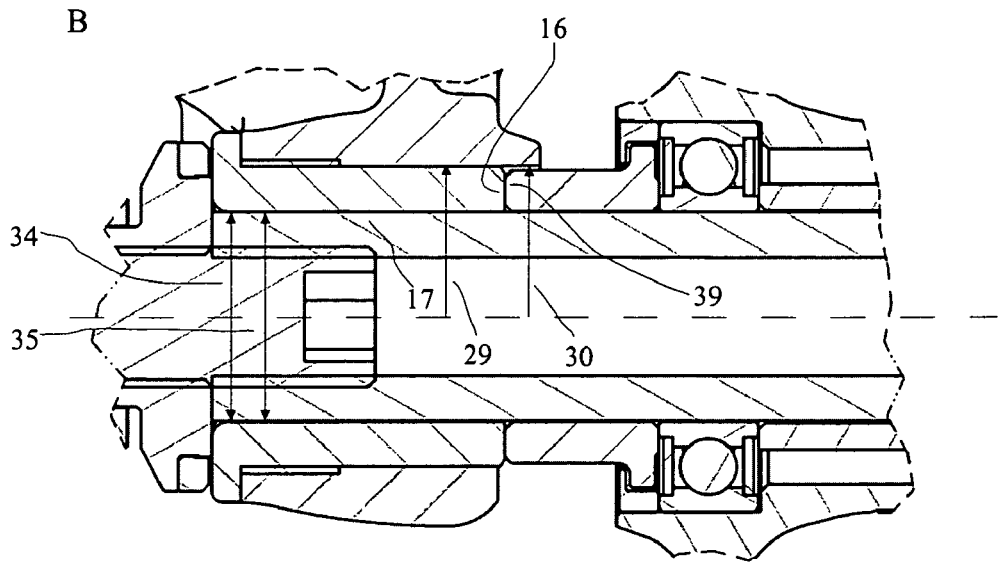
FIG. 5 an enlarged illustration of detail B of FIG. 4.
Figure 6:
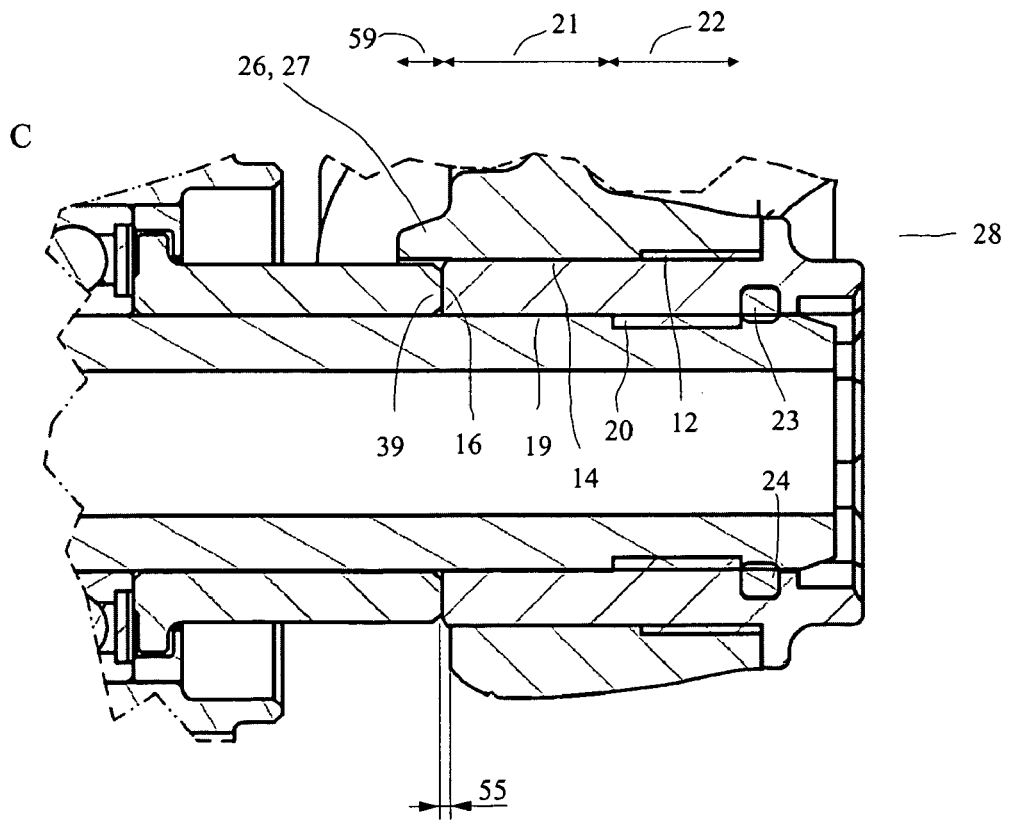
FIG. 6 an enlarged illustration of detail C in FIG. 4.

In the FIGS. 5 and 6 the details B and C are illustrated in section in an enlarged illustration. FIG. 5 shows the end of the hub 3 arranged closer to the operating member 33 and a section of the tube component 4. FIG. 6 shows a section of the tube component 5 and of the bushing device 11 arranged therein.

The bushing device 10 comprises over its entire axial length an inner diameter 35 fitted to the outer diameter 34 of the axle 32 so as to provide a snug fit 17 which provides for stability and rigidity of a mounted wheel.

The radius 29 of the cylindrical mounting opening 25 corresponds to a radius 30 of the axial projecting edge 26 since the cylindrical mounting opening 25 and the axial projecting edge 26 are machined at the inner periphery in one process step so as to simplify manufacture.

The other bushing part 11 comprises a female thread 20 at the inner periphery over a part 22 of the axial length followed in the axial direction by an axial length 21 in which a snug fit 19 is present to which end the inner diameter of the bushing device 11 is matched to the outer diameter of the axle 32.

In an outwardly region adjacent to the thread 20 an annular internal groove 23 is provided in the bushing device 11 in which an O-ring 24 is arranged to inhibit a possible rotational movement of the axle 32.

On the whole the invention provides a bicycle component 1 which can for example be employed as a front wheel fork 100 but may be employed for mounting the rear wheel wherein the bicycle component may for example be configured as a frame or a frame component serving to receive the rear wheel.

The invention claimed is:

1. A bicycle component comprising:
a wheel mount configured for receiving a wheel with a hub and including at least two tube components at the end portions, a mounting device provided at each of the end portions, wherein each mounting device includes at least one bushing device, wherein the mounting device of at least one tube component has at least one bushing device exchangeably arranged thereat which is suitable and intended to receive and support a hub,
each mounting device defining a cylindrical mounting opening, wherein a radius of the cylindrical mounting opening corresponds to a radius of an axial projecting edge of the mounting device, and wherein the cylindrical mounting opening and the axial projecting edge at the inner periphery are machined in one process step;
at least one bushing device of the one mounting device comprises a snug fit on its inner periphery,
at least one bushing device of the other mounting device comprises a snug fit on its inner periphery and axially adjacent thereto a female thread with both the snug fit and the female thread extending over part of the axial length of the bushing device, and
the hub including opposing outer surfaces and projections extending beyond the outer surfaces, the projections configured to respectively contact the bushing device in the corresponding mounting device and space the opposing outer surfaces of the hub from the corresponding mounting devices.

2. The bicycle component according to claim 1, wherein said at least one bushing device comprises on its outer surface a snug fit extending in particular only over part of the axial length of the bushing device.

3. The bicycle component according to claim 1, wherein said at least one bushing device is glued and/or form-fittingly received in the mounting device.

4. The bicycle component according to claim 1, wherein said at least one bushing device comprises at least one axial mating surface.

5. The bicycle component according to claim 1, wherein said at least one bushing device of the one mounting device comprises a snug fit on its inner periphery extending over the whole axial length of the bushing device.

6. The bicycle component according to claim 1, wherein said at least one bushing device of the other mounting device comprises an internal peripheral groove with an O-ring.

7. The bicycle component according to claim 1, wherein an axle device is provided which comprises an elongated, cylindrical axle.

8. The bicycle component according to claim 7, wherein the axle device comprises an axial mating surface on one side provided to mate with an axial mating surface on a bushing device.

9. The bicycle component according to claim 7, wherein an operating member protrudes from the axle outwardly, interacting with a thread so as to tighten the axle device as the operating member is rotated.

10. The bicycle component according to claim 9, wherein the operating member is positioned close enough to a tube component for the tube component to protrude into the pivot range of the operating member.

11. The bicycle component according to claim 10, wherein the operating member can first rotate entirely freely when tightening, approaching the tube component in tightening until the operating member is positioned close enough to a tube component for the tube component to protrude into the pivot range of the operating member.

12. The bicycle component according to claim 9, wherein the operating member is axially movable outwardly against the biasing force of a biasing device to bring the operating member out of engagement with the axle such that the operating member can be rotated without transmitting the rotational movement to the thread.

13. The bicycle component according to claim 7, wherein the axle device is provided with a ratchet mechanism.

14. The bicycle component according to claim 1, wherein the hub bears against the bushing devices with front end faces only.

15. The bicycle component according to claim 1, wherein the front end faces of the hub are formed by knurled disks.

16. The bicycle component according to claim 1, wherein said at least one bushing device consists of one of a hard anodized aluminum alloy, steel and a titanium alloy.

17. The bicycle component according to claim 1, wherein said at least one tube component consists of a fibrous composite material.

18. The bicycle component according to claim 1, wherein said at least one tube component is configured integrally with the mounting device.

19. The bicycle component according to claim 1, wherein contact surfaces are configured on the bushing devices between the hub and the wheel mount and contact surfaces are configured on the bushing devices between the axle and the wheel mount.

20. A bicycle component comprising:
a wheel mount configured for receiving a wheel with a hub and including at least two tube components at the end portions, a mounting device provided at each of the end portions, wherein each mounting device includes at least one bushing device, wherein the mounting device of at least one tube component has at least one bushing device exchangeably arranged thereat which is suitable and intended to receive and support a hub,
at least one bushing device of the one mounting device comprising a snug fit on its inner periphery,
at least one bushing device of the other mounting device comprising a snug fit on its inner periphery and axially adjacent thereto a female thread with both the snug fit and the female thread extending over part of the axial length of the bushing device,
each of the mounting devices comprising an axially, inwardly extending projecting edge as an end bearing, wherein the end bearings are configured to be sickle-shaped and are substantially provided on the upper side of the mounting device.

21. A bicycle component comprising:
a wheel mount configured for receiving a wheel with a hub and including at least two tube components at the end portions, a mounting device provided at each of the end portions, wherein each mounting device includes at least one bushing device, wherein the mounting device of at least one tube component has at least one bushing device exchangeably arranged thereat which is suitable and intended to receive and support a hub,
at least one bushing device of the one mounting device comprising a male thread extending only over part of the axial length of the bushing device and a snug fit on its inner periphery,
at least one bushing device of the other mounting device comprising a snug fit on its inner periphery and axially adjacent thereto a female thread with both the snug fit and the female thread extending over part of the axial length of the bushing device,
wherein said at least one bushing device comprises a male thread extending only over part of the axial length of the bushing device.

22. A bicycle component comprising:
a wheel mount configured for receiving a wheel with a hub, and a fixed axle, said wheel mount including at least two tube components at the end portions, a mounting device provided at each of the end portions between which the hub is received and supported, wherein each mounting device includes at least one bushing device, wherein the mounting device of at least one tube component has at least one bushing device exchangeably arranged thereat which is suitable and intended to receive and support a hub, wherein the mounting devices comprise axially inwardly an axial projecting edge as an end bearing at a radial distance from the adapting pieces of the hub,
at least one bushing device of the one mounting device comprises a snug fit on its inner periphery,
at least one bushing device of the other mounting device comprises a snug fit on its inner periphery and axially adjacent thereto a female thread with both the snug fit and the female thread extending over part of the axial length of the bushing device, and
the hub including opposing outer surfaces and projections extending beyond the outer surfaces, the projections configured to respectively contact the bushing device in the corresponding mounting device and space the opposing outer surfaces of the hub from the corresponding mounting devices.

* * * * *